US012134477B2

(12) United States Patent
Shivaprakash Gowda et al.

(10) Patent No.: US 12,134,477 B2
(45) Date of Patent: Nov. 5, 2024

(54) SYSTEMS AND METHODS FOR GAS GENERATOR FOR PNEUMATIC DEICER

(71) Applicant: GOODRICH CORPORATION, Charlotte, NC (US)

(72) Inventors: Anagha Shivaprakash Gowda, Bangalore (IN); Sugumaran Selvaraj, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 89 days.

(21) Appl. No.: 17/856,334

(22) Filed: Jul. 1, 2022

(65) Prior Publication Data
US 2023/0312110 A1 Oct. 5, 2023

(30) Foreign Application Priority Data
Mar. 30, 2022 (IN) .............................. 202241018919

(51) Int. Cl.
B64D 15/04 (2006.01)

(52) U.S. Cl.
CPC .................................... B64D 15/04 (2013.01)

(58) Field of Classification Search
CPC .............................. B64D 15/04; B64D 15/166
See application file for complete search history.

(56) References Cited

U.S. PATENT DOCUMENTS

| 1,836,432 | A | * | 12/1931 | Barlow | B64D 15/04 244/134 B |
| 2,883,129 | A | * | 4/1959 | Macintyre | B64D 15/166 244/134 R |
| 4,606,319 | A | * | 8/1986 | Silva | F02M 13/08 123/576 |
| 2013/0341465 | A1 | | 12/2013 | Massey et al. | |
| 2015/0184592 | A1 | * | 7/2015 | Pearce | F02C 7/22 60/779 |
| 2016/0214726 | A1 | * | 7/2016 | Giamati | G01R 31/54 |
| 2018/0105277 | A1 | | 4/2018 | Wiegers et al. | |
| 2018/0170555 | A1 | | 6/2018 | Phillips | |
| 2019/0100322 | A1 | * | 4/2019 | Schank | B64C 29/0083 |
| 2019/0383220 | A1 | * | 12/2019 | Mackin | B64D 15/02 |

FOREIGN PATENT DOCUMENTS

| EP | 3242004 | 11/2017 |
| EP | 3335992 | 6/2018 |
| EP | 3738884 | 11/2020 |
| GB | 2167723 | 6/1986 |
| WO | 2015059427 | 4/2015 |

OTHER PUBLICATIONS

European Patent Office, European Search Report dated Jul. 28, 2023 in Application No. 23165645.5.

* cited by examiner

Primary Examiner — Christopher D Hutchens
(74) Attorney, Agent, or Firm — SNELL & WILMER L.L.P.

(57) ABSTRACT

Ice may form along the leading edge of an aircraft wing. A pneumatic deicing system may be configured to crack and dislodge ice along the leading edge of the wing. The pneumatic deicing system may comprise a deicing boot assembly having a deicing boot attached to the leading edge, and a gas generator fluidly coupled to the deicing boot assembly. The gas generator may comprise a propellant and may decompose the propellant, liberating a compressed gas. The compressed gas may be directed to the deicing boot assembly, inflating the deicing boot, which may crack and dislodge the ice.

4 Claims, 5 Drawing Sheets

SYSTEMS AND METHODS FOR GAS GENERATOR FOR PNEUMATIC DEICER

CROSS-REFERENCE TO RELATED APPLICATIONS

This application claims priority to, and the benefit of, India Patent Application No. 202241018919, filed Mar. 30, 2022 (DAS Code AD47) and titled "SYSTEMS AND METHODS FOR GAS GENERATOR FOR PNEUMATIC DEICER," which is incorporated by reference herein in its entirety for all purposes.

FIELD

This disclosure relates generally to pneumatic deicers for aircraft, more specifically, gas generators for pneumatic deicers.

BACKGROUND

Pneumatic deicing boots are a type of ice protection system installed to aircraft surfaces to permit deicing in flight. The deicing boots may consist of thick rubber membranes installed to the leading edge of a wing. As atmospheric icing occurs and ice builds up, the pneumatic deicing boot may inflate. Pneumatic deicing boots typically rely on compressed air for inflation. Cooled bleed air may be used to inflate the deicing boots.

SUMMARY

A pneumatic deicing system is disclosed herein. In various embodiments, the system may comprise a deicing boot assembly. In various embodiments, the system may comprise a gas generator fluidly coupled to a pressure regulator of the deicing boot assembly. In various embodiments, the gas generator may comprise a propellant storage unit. In various embodiments, the propellant storage unit may comprise a propellant. In various embodiments, the gas generator may further comprise a combustion chamber. In various embodiments, the combustion chamber further may comprise an ignitor. In various embodiments, the ignitor may be configured to contact the propellant. In various embodiments, the ignitor may be configured to supply an electric pulse to the propellant. In various embodiments, the electric pulse may be configured to pass through the propellant.

In various embodiments, the gas generator may further comprise a residual collector. In various embodiments, the residual collector may be coupled to the combustion chamber. In various embodiments, the gas generator may be electrically coupled to a power supply. In various embodiments, the power supply may be configured to send an electric pulse into the gas generator.

In various embodiments, the propellant may be a sodium-based propellant. The propellant may be configured to be transferred from the propellant storage unit to the combustion chamber. In various embodiments, the propellant may be configured to decompose in response to the electric pulse passing through the propellant. In various embodiments, the decomposed propellant may be configured to be liberated as a high pressure gas. In various embodiments, the high pressure gas may be a high pressure nitrogen gas. In various embodiments, the gas generator may be configured to direct the high pressure gas from the combustion chamber to the deicing boot assembly. In various embodiments, the deicing boot assembly may comprise a deicing boot, wherein the deicing boot may be coupled to a leading edge of an aircraft wing. In various embodiments, the deicing boot may comprise a plurality of ridges.

A gas generator is also disclosed herein. In various embodiments, the gas generator may comprise a propellant storage unit. In various embodiments, the gas generator may comprise a combustion chamber. In various embodiments, the combustion chamber may further comprise an ignitor. In various embodiments, the gas generator may comprise a residual collector. The residual collector may be coupled to the combustion chamber.

In various embodiments, the propellant storage unit may further comprise a propellant. The propellant may be configured to be transferred from the propellant storage unit to the combustion chamber. In various embodiments, the ignitor may be configured to contact the propellant. The propellant may be a sodium-based propellant.

In various embodiments, the gas generator may further comprise a power supply. The power supply may be configured to send an electric pulse into the gas generator. In various embodiments, the ignitor may be configured to supply the electric pulse to the propellant. In various embodiments, the electric pulse may be configured to pass through the propellant. In various embodiments, the propellant may be configured to decompose in response to the electric pulse passing through the propellant. In various embodiments, the decomposed propellant may be configured to be liberated as a high pressure gas. In various embodiments, the gas generator may be configured to expel the high pressure gas. In various embodiments, the high pressure gas may be a high pressure nitrogen gas.

A method for testing a pneumatic deicing system is disclosed herein. In various embodiments, the method may comprise testing a deicing boot assembly. In various embodiments, the method may comprise testing a gas generator coupled to the deicing boot assembly. In various embodiments, the gas generator may further comprise a propellant storage unit. In various embodiments, the gas generator may comprise a combustion chamber. The combustion chamber may further comprise an ignitor. In various embodiments, the gas generator may comprise a residual collector. In various embodiments, the gas generator may comprise a power supply. In various embodiments, testing the gas generator may further comprise generating a high pressure gas. In various embodiments, testing the deicing boot assembly may further comprise inflating as deicing boot of the deicing boot assembly.

In various embodiments, testing the gas generator may comprise the propellant storage unit comprising a propellant, wherein the propellant may be a sodium-based propellant.

In various embodiments, the generating may further comprise transferring the propellant from the propellant storage unit to the combustion chamber, wherein the ignitor may be configured to contact the propellant. In various embodiments, the generating may further comprise sending an electric pulse from the power supply and into the gas generator. In various embodiments, the generating may further comprise supplying, by the ignitor, the electric pulse to the propellant. In various embodiments, the generating may further comprise passing the electric pulse through the propellant. In various embodiments, the generating may further comprise decomposing the propellant in response to the electric pulse passing through the propellant. In various embodiments, the decomposing may further comprise liberating the decomposed propellant as the high pressure gas. In various embodiments, the inflating may further comprise directing the high pressure gas to the deicing boot. In various embodiments, the inflating may further comprise inflating the deicing boot with the high pressure gas. In various embodiments, the high pressure gas may be nitrogen gas.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

Figure 1:
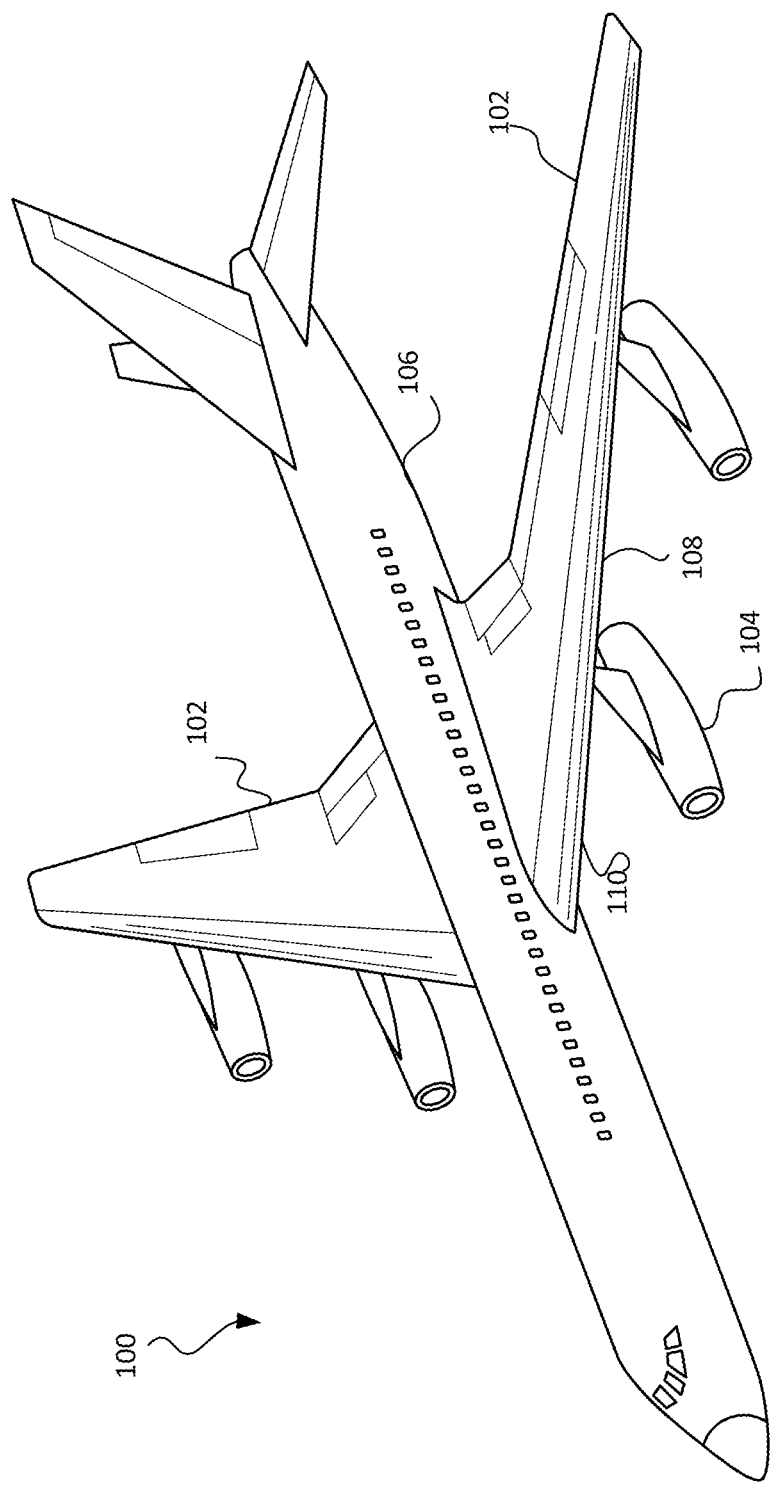
FIG. 1 illustrates an aircraft, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

An aircraft must be pushed through the air to generate lift. Aircraft wings may generate most of the lift associated with holding the aircraft in the air. Accordingly, aircraft wings may be shaped as an airfoil. An airfoil may be a cross-sectional shape of an object whose motion through a gas is capable of generating lift. The air may resist aircraft motion in the form of aerodynamic drag. Turbine engines may provide thrust to overcome drag and push the aircraft forward. A wing's aerodynamic efficiency may be expressed as a lift-to-drag ratio. A high lift-to-drag ratio may be associated with a smaller thrust to propel the wings through the air at sufficient lift, and vice versa.

Ice formation on a leading edge of a wing may disrupt or destroy the smooth flow of air along the wing, increasing drag while decreasing the ability of the wing to create lift. Accordingly, ice formation on the leading edge of a wing may prevent an aircraft from taking off, or worse, may interfere with flight. Pneumatic deicing boots may be installed along the leading edges of aircraft wings. These deicing boots may be inflated with compressed air, cracking the ice along the leading edge, and permitting the ambient air or airflow to discharge the ice from the leading edge.

Referring to FIG. 1, an aircraft 100 is shown in accordance with various embodiments. The aircraft 100 may comprise wings 102 to generate lift, turbine engines 104 to provide thrust, and a fuselage 106 to hold the aircraft components together and carry passenger and cargo. The aircraft wings 102 may further comprise a pneumatic deicing assembly 108 along the leading edges 110 of the wings.

Figure 2:
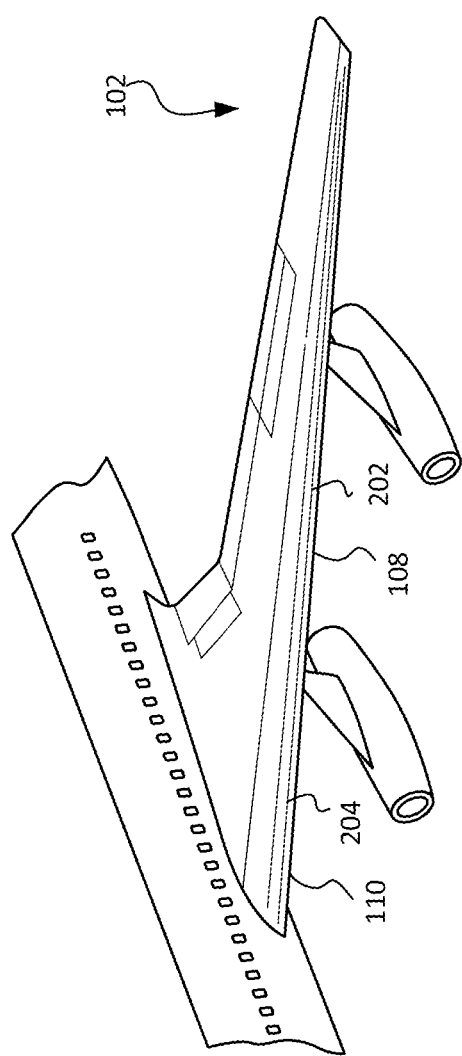
FIG. 2 illustrates an aircraft wing, in accordance with various embodiments.

Referring to FIG. 2, the aircraft wing 102 is shown in accordance with various embodiments. In various embodiments, the wing 102 may comprise the pneumatic deicing assembly 108. The pneumatic deicing assembly 108 may comprise a deicing boot 202. The deicing boot 202 may be disposed along the leading edge 110 of the wing 102. In various embodiments, the assembly 108 may comprise a pressure regulator (FIG. 4, reference numeral 400) fluidly coupled to an air source such as, for example, a gas generator 204.

Figure 3A:
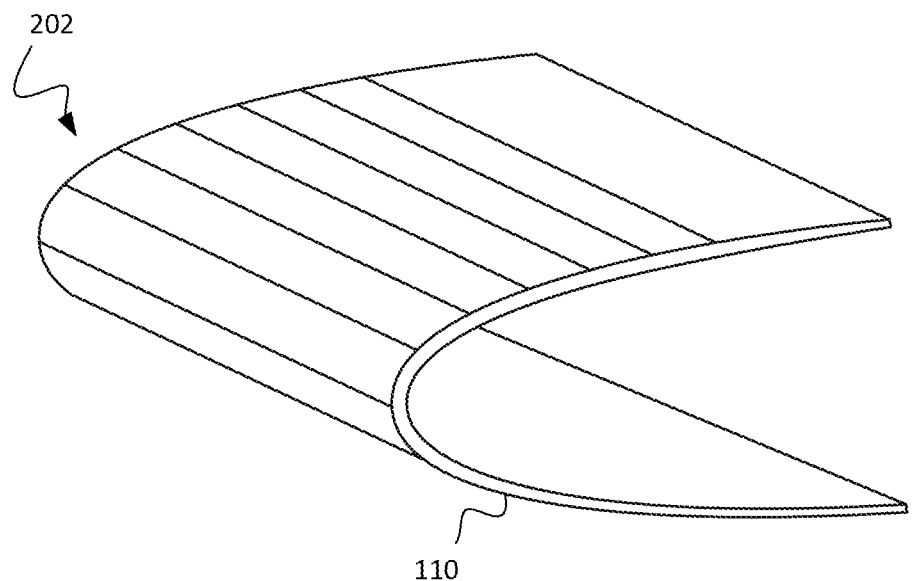
FIG. 3A illustrates a deicing boot in an idle position, in accordance with various embodiments.
Figure 3B:
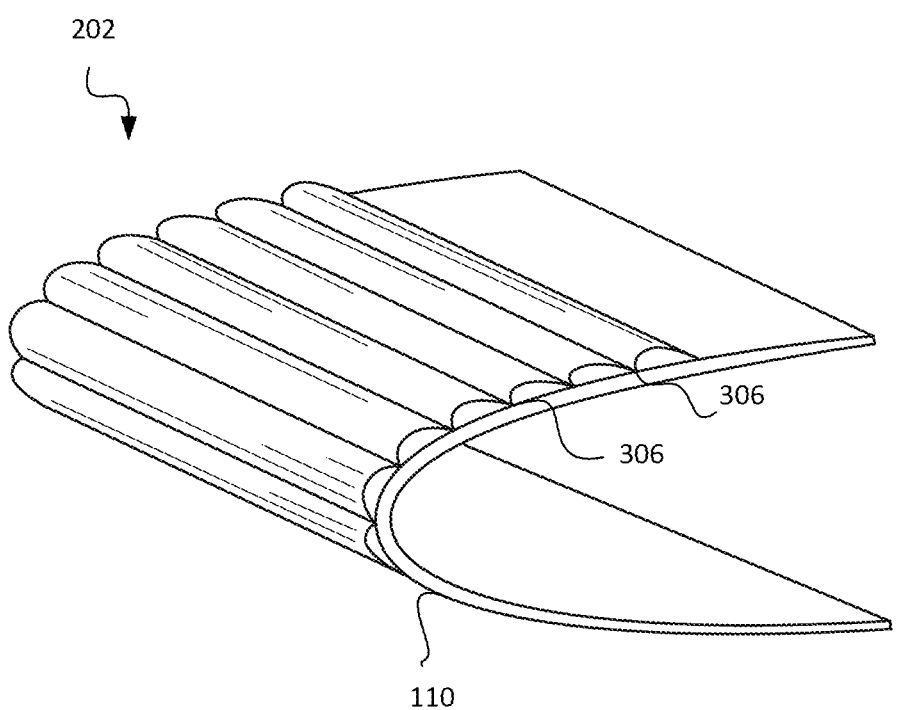
FIG. 3B illustrates a deicing boot in an engaged position, in accordance with various embodiments.

Portions of a cross-section of the deicing boot 202 are shown in FIGS. 3A and 3B. Specifically, FIG. 3A shows the deicing boot 202 in an idle position. The deicing boot may be installed along the leading edge 110 (FIG. 1) of the wing 102. In various embodiments, the deicing boot 202 may be installed along the leading edge of various control surfaces of the aircraft, such as, for example, horizontal and vertical stabilizers. The deicing boot 202 may be comprised of a rubber membrane. The rubber membrane of a deicing boot 202 may be comprised of natural rubber, neoprene rubber, nitrile rubber, silicone rubber, EPDM rubber, and the like.

FIG. 3B shows the deicing boot 202 in an engaged, or inflated, position. In various embodiments, the aircraft 100 (FIG. 1) may detect ice formation along the leading edge 110. Compressed gas may then be directed to the deicing boot 202 to inflate the deicing boot 202. As shown, the inflated deicing boot 202 may comprise a plurality of ridges 306. The geometry of these ridges 306, when inflated, may enable the ice to crack and dislodge from the leading edge 110. The ice may then be blown away by the airflow. The deicing boot 202 may then return to the idle position shown in FIG. 3A, returning the leading edge 110 to its optimal shape.

Figure 4:
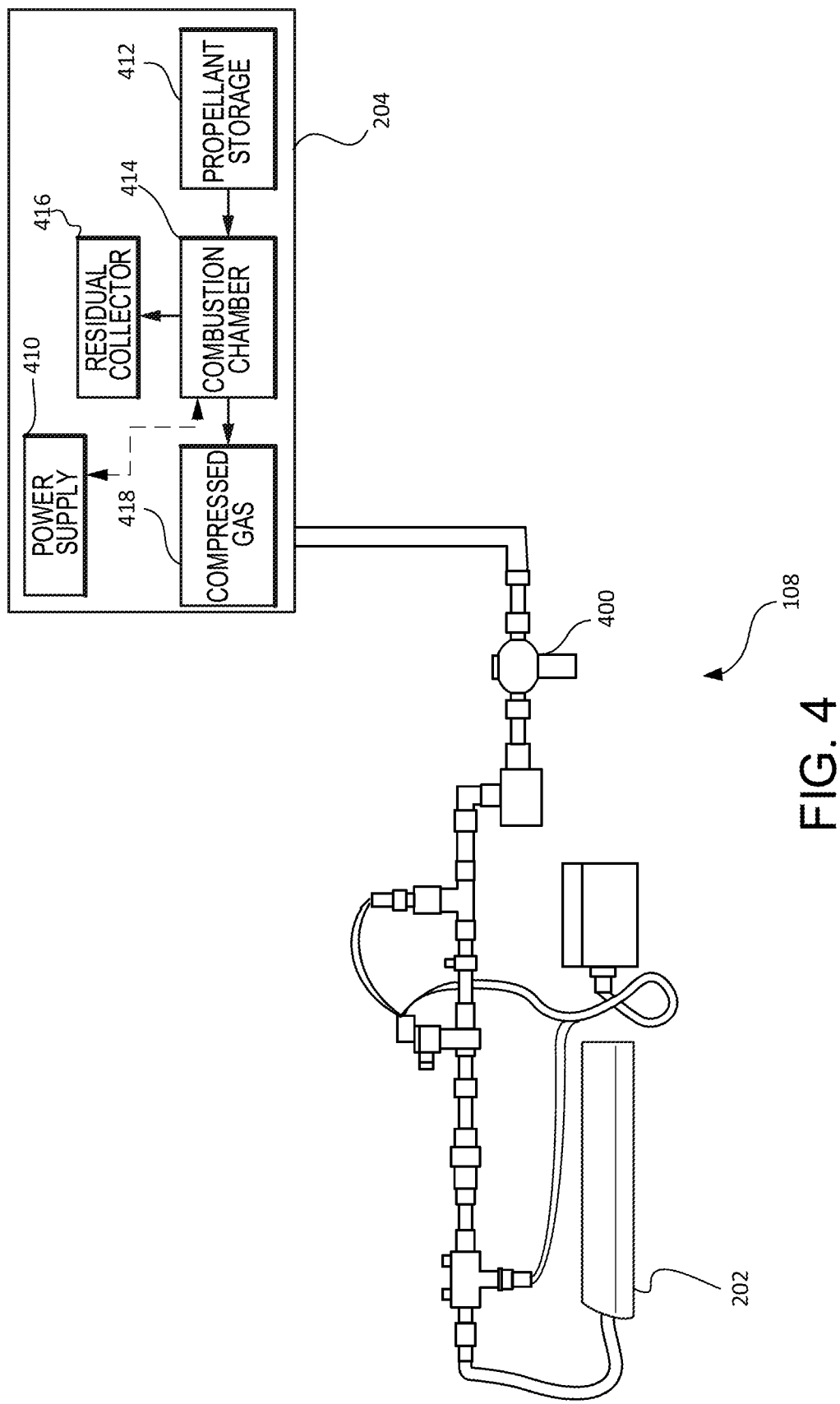
FIG. 4 illustrates gas generator and a deicing boot assembly, in accordance with various embodiments.

Referring to FIG. 4, the gas generator 204 and the deicing boot assembly 108 are shown in accordance with various embodiments. The gas generator 204 may be disposed within the wing structure, protecting the gas generator 204. In various embodiments, the gas generator 204 may be placed at any location suitable for the preferred design of an aircraft 100. In various embodiments, the gas generator 204 may be electrically coupled to a power supply 410. The power supply 410 may be, for example, the aircraft auxiliary power unit (APU), engine power, generators, and the like. In various embodiments, the power supply 410 may send an electric pulse into the gas generator 204.

In various embodiments, the gas generator 204 may comprise a propellant storage unit 412. In various embodiments, the gas generator 204 may comprise a propellant. The propellant may be solid and lightweight, enabling the gas generator 204 to be a compact system. The propellant may be packed into the propellant storage unit 412 by any suitable configuration preferred for aircraft design. The propellant may be sodium-based propellant. For example, the propellant may be sodium azide, guanidine nitrate, 5-aminotetrazole, bitetrazole dihydrate, nitroimidazole, basic copper nitrate, and the like. The propellant storage unit 412 may store the propellant until commencement of a deicing cycle.

In various embodiments, the gas generator may further comprise a combustion chamber 414. In various embodiments, the propellant may be transferred from the propellant storage unit 412 to the combustion chamber 414. As the electric pulse passes through the combustion chamber 414, the propellant may decompose in response to the electric pulse passing through the propellant. Accordingly, the decomposed propellant may be liberated as a high pressure gas 418 within the combustion chamber 414. In various embodiments, the high pressure gas 418 may be a high pressure nitrogen gas. In various embodiments, the gas generator 204 may further comprise a residual collector 416. The residual collector 416 may collect excess liberated gas that is not directed to the deicing boot 202. In various embodiments, the gas generator 204 may expel the high pressure gas 418. In various embodiments, the gas generator 204 may direct the high pressure gas 418 from the combustion chamber 414 to the deicing boot assembly 108, which may further direct the high pressure gas 418 to the deicing boot 202, inflating the deicing boot 202 with the chemically generated high pressure gas. The gas generator 204 may be fluidly coupled to the pressure regulator 400 of the deicing boot assembly 108 by a tube, channel, pipe, duct, and the like. The deicing boot assembly 108 may comprise additional components, such as, for example, controllers, pressure regulators, ejector flow control valves, flow control valves, water separators, check valves, isolations valves, pressure switches, and like components that may enable directing gas to the deicing boot 202.

There may be several benefits in utilizing chemically generated gas to inflate deicing boots. First, inflating deicing boots with chemically generated gas may reduce the aircraft's dependence on engine bleed air. Engine bleed air is compressed air taken from the compressor stage of a gas turbine upstream of its fuel-burning sections. Bleed air may be used for a variety of purposes on an aircraft, such as, for example, cabin pressurization, cross-starting another engine, engine cooling, pressurizing hydraulic reservoirs, and the like. Reducing reliance on bleed air for deicing may enable bleed air to be diverted to other useful purposes on the aircraft. Moreover, a chemical generation system may enable deicing boots to be adapted for electric propulsion aircraft, which could not rely on the bleed air generated from gas turbine engines.

Gas generation in a chemical generation system may also occur on an as-needed basis, burning low-cost propellant compounds that have long storage lives. For example, the gas generator may not need to decompose the entire propellant for a given deicing cycle. Moreover, the gas generator may not need to direct all of the liberated compressed gas to the deicing boot. For example, the gas generator may direct some of the liberated gas to the residual collector to be stored. Additionally, the gas generator may not require high amounts of solid propellant to be stored. For example, the gas generator may generate up to 1 Liter (0.22 imperial gallons) of gas from 2 grams (0.07 Ounces) of solid propellant. Nitrogen gas may also be an eco-friendly alternative to traditional bleed air.

Figure 5:
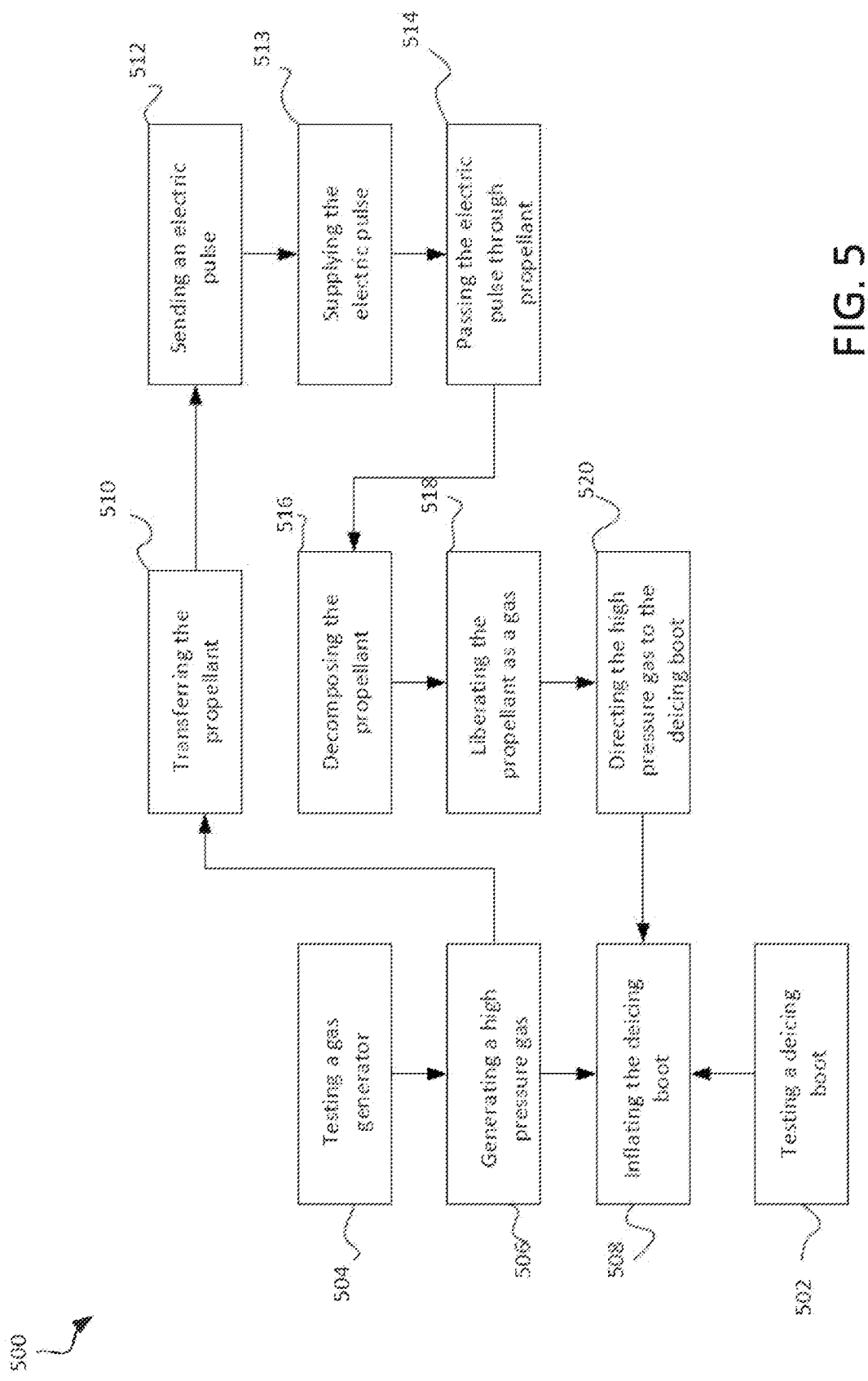
FIG. 5 illustrates a method for testing a pneumatic deicing system, in accordance with various embodiments.

FIG. 5 illustrates a method (step 500) for testing a pneumatic deicing system, in accordance with various embodiments. The method (step 500) may comprise testing (step 502) a deicing boot assembly. In various embodiments, the method (step 500) may comprise testing (step 504) a gas generator coupled to the deicing boot assembly. In various embodiments, the gas generator may further comprise a propellant storage unit. In various embodiments, the gas generator may comprise a combustion chamber. In various embodiments, the combustion chamber may further comprise an ignitor. In various embodiments, the gas generator may comprise a residual collector. In various embodiments, the gas generator may comprise a power supply. In various embodiments, testing the gas generator (step 504) may further comprise generating (step 506) a high pressure gas. In various embodiments, testing the deicing boot assembly (step 502) may comprise inflating (step 508) a deicing boot of the deicing boot assembly.

In various embodiments, testing the gas generator (step 504) may comprise the propellant storage unit comprising a propellant, wherein the propellant may be a sodium-based propellant.

In various embodiments, the generating (step 506) may further comprise transferring (step 510) the propellant from the propellant storage unit to the combustion chamber, wherein the ignitor may contact the propellant. In various embodiments, the generating (step 506) may further comprise sending (step 512) an electric pulse from the power supply and into the gas generator. In various embodiments, the generating (step 506) may further comprise supplying (step 513) by the ignitor, the electric pulse to the propellant. In various embodiments, the generating (step 506) may further comprise passing (step 514) the electric pulse through the propellant. In various embodiments, the generating (step 506) may further comprise decomposing (step 516) the propellant in response to the electric pulse passing through the propellant. In various embodiments, the decomposing may further comprise liberating (step 518) the decomposed propellant as the high pressure gas. In various embodiments, the inflating (step 508) may further comprise directing (step 520) the high pressure gas to the deicing boot assembly. In various embodiments, the inflating (step 508) may further comprise inflating the deicing boot with the high pressure gas, wherein the high pressure gas may be nitrogen gas.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A pneumatic deicing system, comprising:
   a deicing boot assembly, wherein the deicing boot assembly comprises a pneumatic deicing boot; and
   a gas generator fluidly coupled to a pressure regulator of the deicing boot assembly and electrically coupled to a power supply, wherein the power supply is configured to send a first electric pulse into the gas generator, and wherein the gas generator comprises:
      a propellant storage unit further comprising a sodium-based propellant, and
      a combustion chamber further comprising an ignitor, the ignitor configured to contact the propellant and to supply a second electric pulse to the propellant, wherein the second electric pulse is configured to pass through the propellant, and
      a residual collector coupled to the combustion chamber, wherein the sodium-based propellant is configured to be transferred from the propellant storage unit to the combustion chamber, wherein the propellant is configured to decompose in response to the second electric pulse passing through the propellant, and wherein the decomposed propellant is configured to be liberated as a high pressure gas.

2. The pneumatic deicing system of claim 1, wherein the high pressure gas is a high pressure nitrogen gas, wherein the gas generator is configured to direct the high pressure gas from the combustion chamber to the deicing boot assembly.

3. The pneumatic deicing system of claim 1, wherein the pneumatic deicing boot is coupled to a leading edge of an aircraft wing.

4. The pneumatic deicing system of claim 1, wherein the pneumatic deicing boot of the deicing boot assembly further comprises a plurality of ridges.

* * * * *